Aug. 2, 1938.　　　　　G. L. WEST　　　　　2,125,410
DOUBLE GLASS WALL CONSTRUCTION
Filed June 11, 1937　　　　5 Sheets-Sheet 2

INVENTOR
George L. West

BY Bradley & Bell
ATTORNEYS.

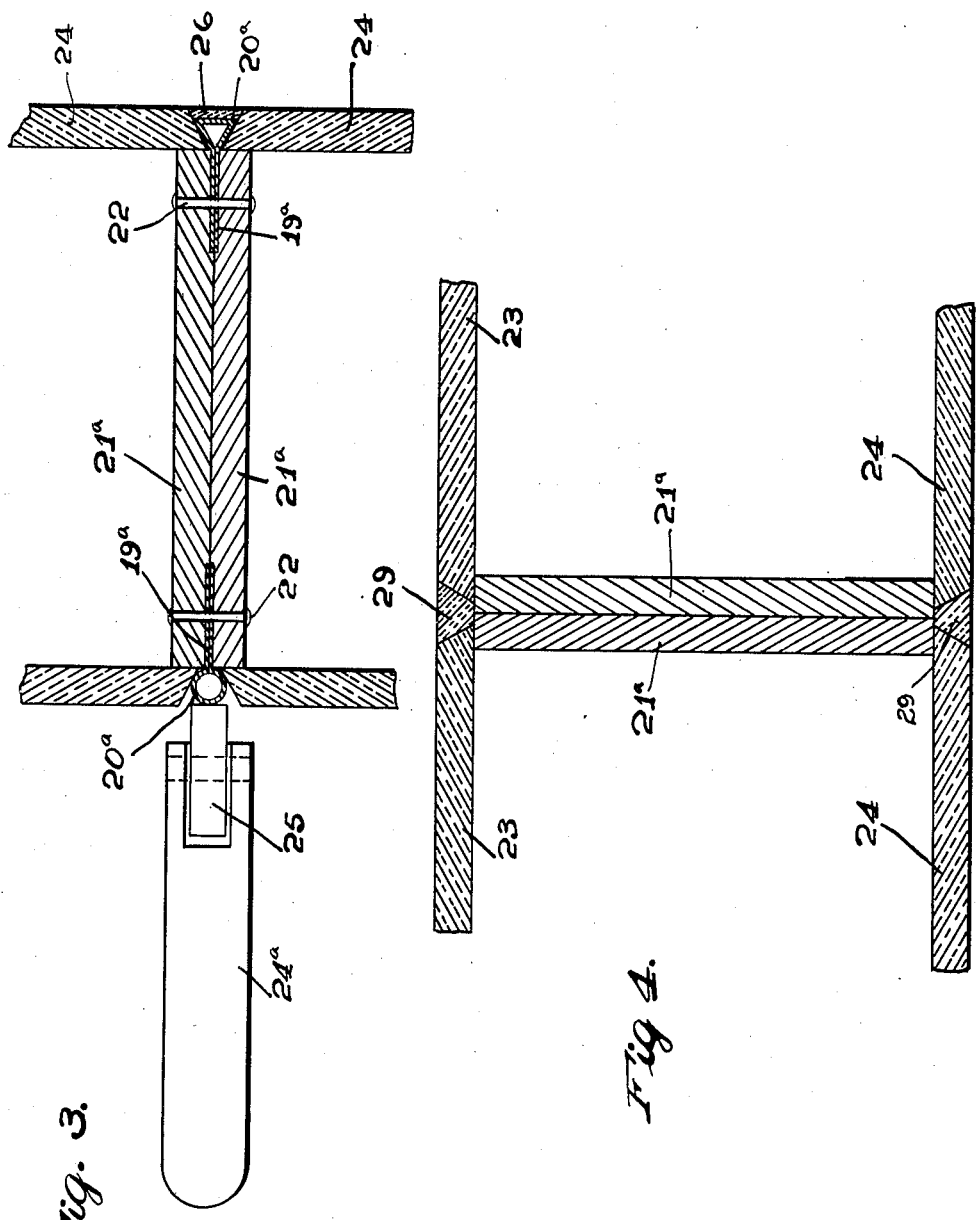

Aug. 2, 1938.     G. L. WEST     2,125,410
DOUBLE GLASS WALL CONSTRUCTION
Filed June 11, 1937     5 Sheets-Sheet 4
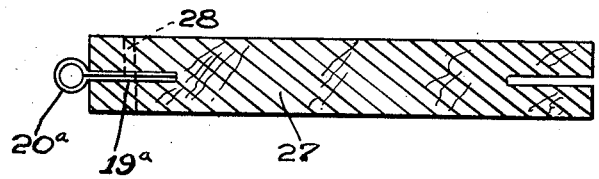
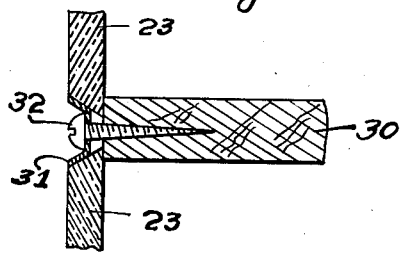
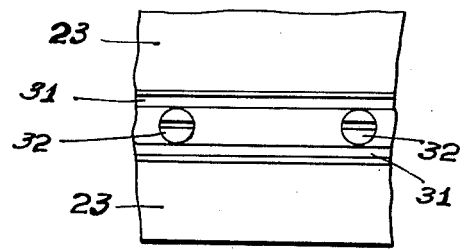
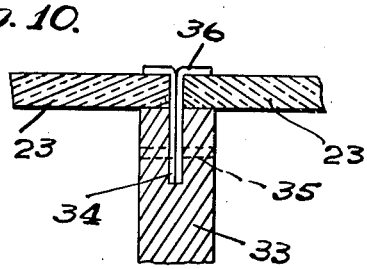
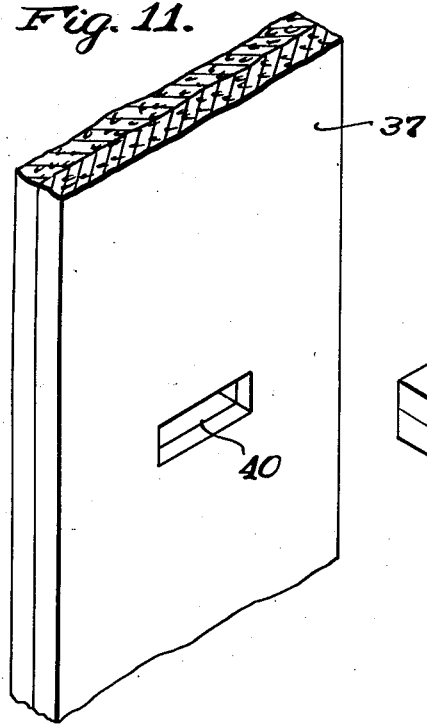
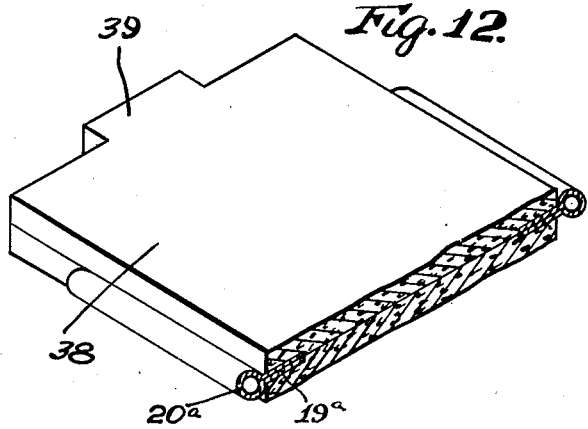
INVENTOR
GEORGE L. WEST
BY Bradley & Bell
ATTORNEYS.

Aug. 2, 1938.  G. L. WEST  2,125,410
DOUBLE GLASS WALL CONSTRUCTION
Filed June 11, 1937   5 Sheets-Sheet 5
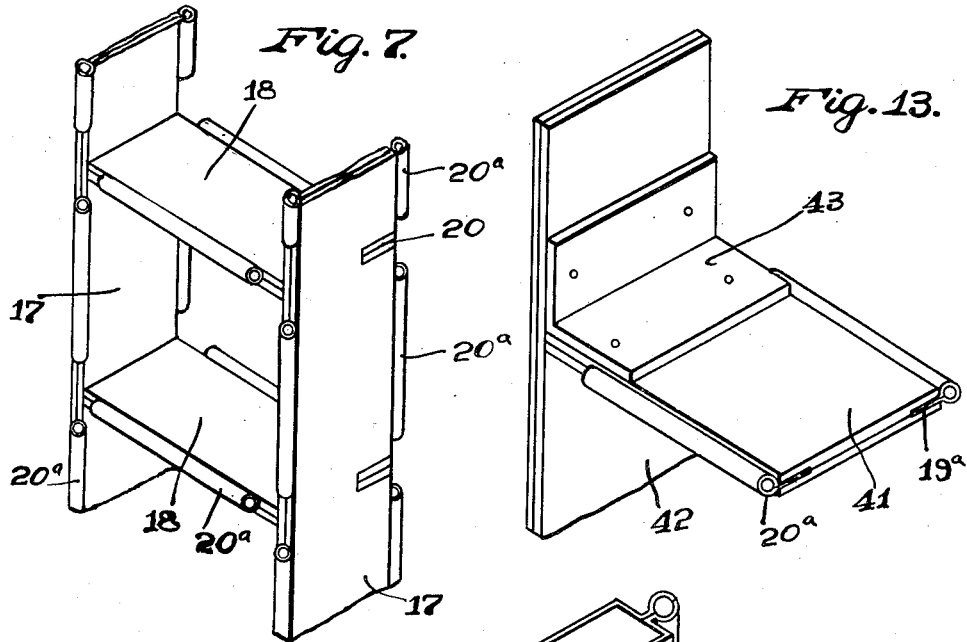
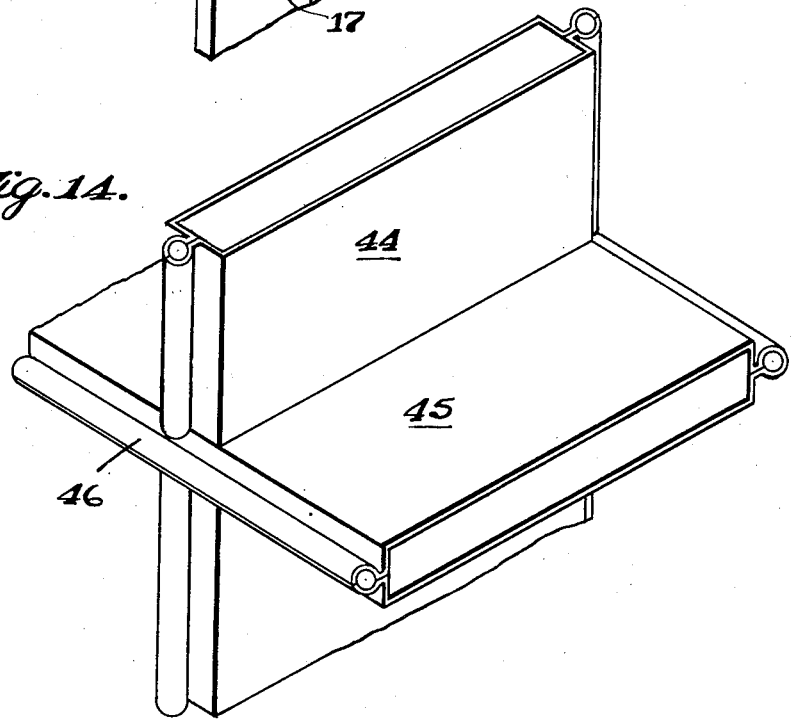
INVENTOR
GEORGE L. WEST
BY Bradley + Bee
ATTORNEYS.

UNITED STATES PATENT OFFICE 2,125,410

DOUBLE GLASS WALL CONSTRUCTION

George L. West, Pittsburgh, Pa., assignor to Pittsburgh Plate Glass Company, Allegheny County, Pa., a corporation of Pennsylvania Application June 11, 1937, Serial No. 147,665

8 Claims. (Cl. 72—44)

Figure 1:
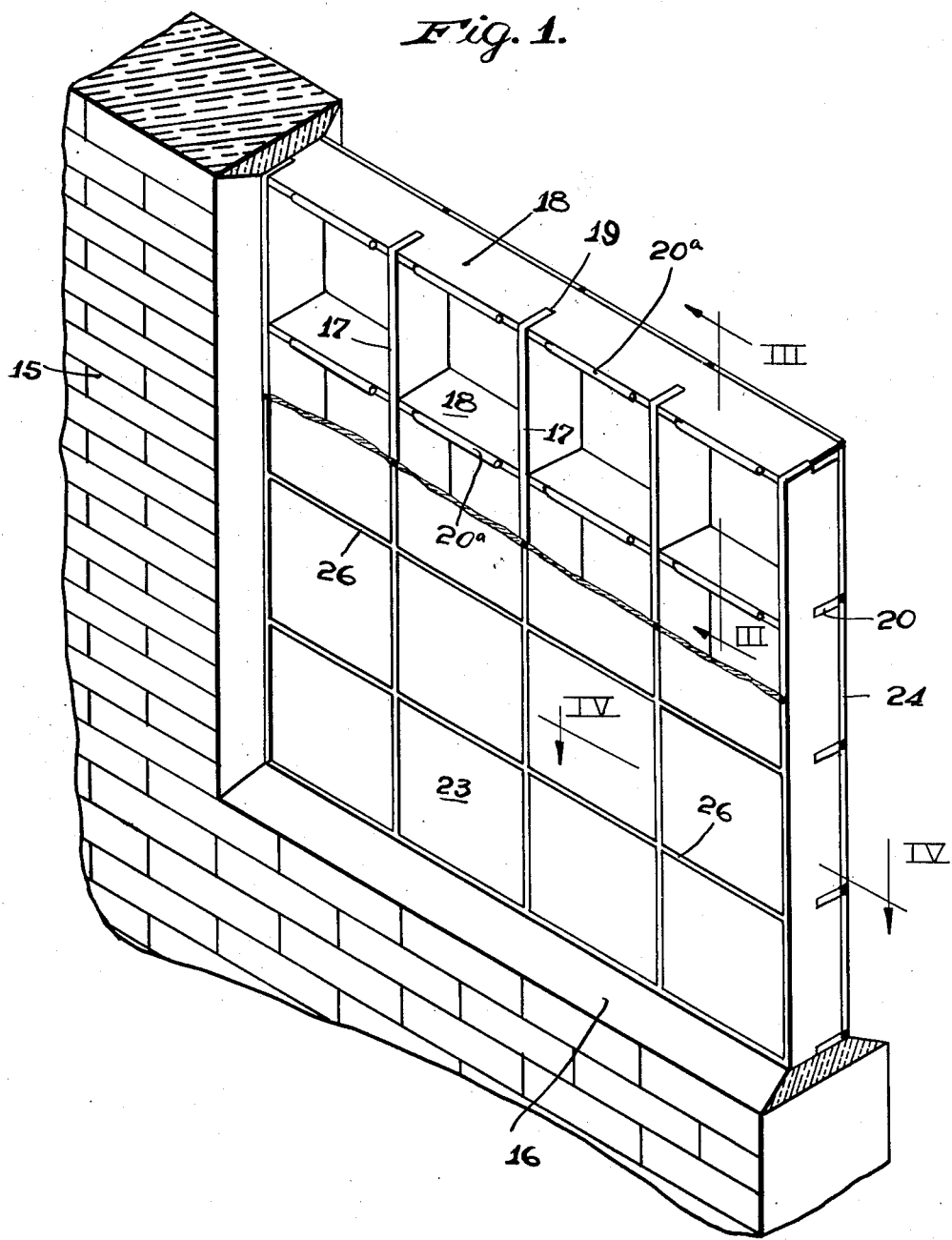
Figure 2:
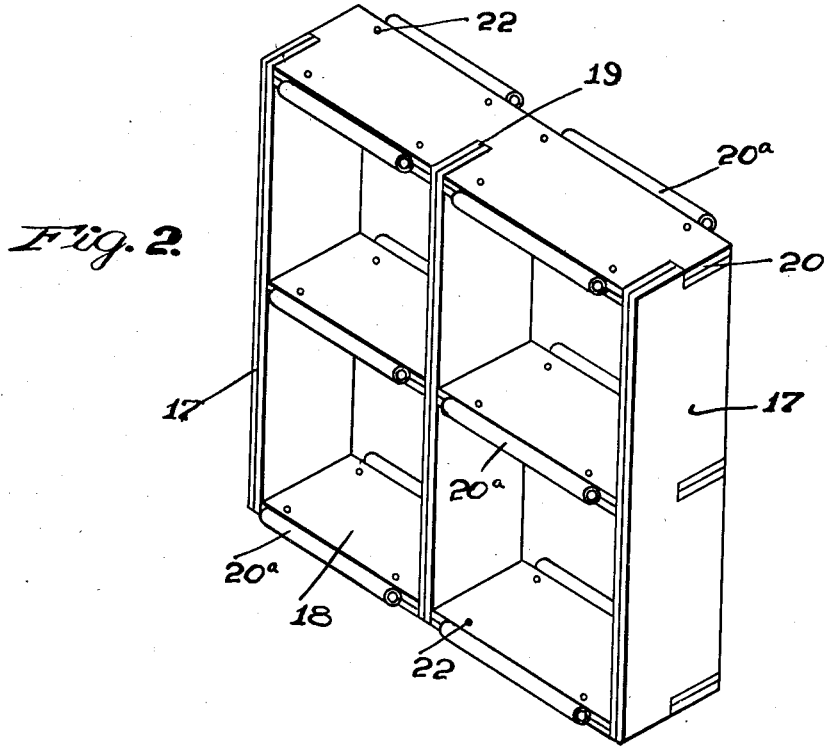
Figure 5:
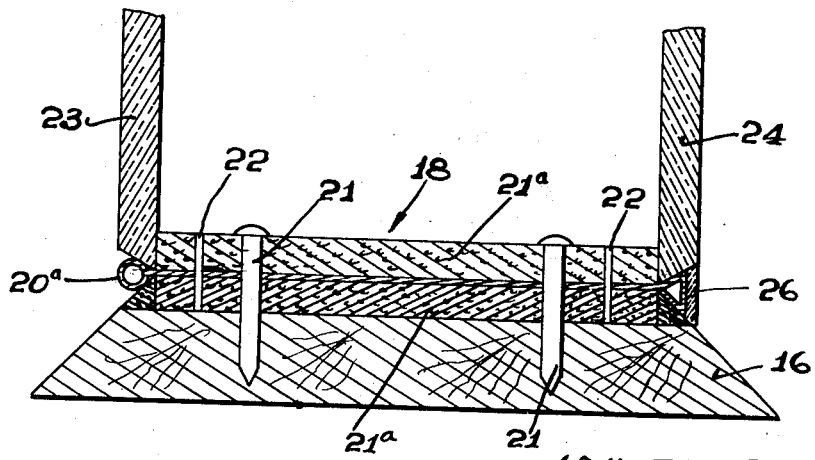

The invention relates to a double glass wall or partition construction having for its principal objects the provision of an improved wall structure having good heat insulating and light transmitting characteristics, which can be made cheaply to fill any desired space, which is relatively strong and light and which can be prefabricated and then installed or can be fabricated on the job. Certain embodiments of the invention are illustrated in the accompanying drawings, wherein:

Figure 1 is a perspective sectional view illustrating the construction. Fig. 2 is a perspective view showing a part of the cellular frame structure. Fig. 3 is a partial section on the line III—III of Fig. 1. Fig. 4 is a partial section on the line IV—IV of Fig. 1. Fig. 5 is a sectional view taken at the edge of the frame. Fig. 6 is a section through a modified form of inner frame strip. Fig. 7 is a perspective view illustrating a modification. Figs. 8 and 9 illustrate a modified means for attaching the glass strips to the cellular frame, Fig. 8 being a section and Fig. 9 a face view of the construction. Fig. 10 is a section view showing a modification. And Figs. 11, 12, 13 and 14 illustrate additional modifications.

Referring first to the construction illustrated in Figs. 1 to 5, the numeral 15 indicates a brick wall, in which the construction constituting the invention is mounted, and 16 is an outer frame, in the present instance of wood, which is secured in the opening in the brick wall and constitutes the boundary of the inner cellular frame, in which the glass plates forming the faces of the installation are supported. The inside sectional frame is made up of the series of vertical strips 17, 17, 17, etc. and a series of horizontal strips 18, 18, 18, etc., the spacing of the sets of strips being preferably such that the cells formed are rectangular and of the same size. The strips 17 and 18 are notched, however, where they cross, as indicated at 19 and 20 so that when fitted together, a cellular frame is formed somewhat similar to that employed in egg crates. The cellular frame is secured in the outside frame 16 by means of the nails 21 (Fig. 5) or other suitable securing means.

As indicated in Fig. 3, each of the strips 17 and 18 is preferably made up of the two layers 21a, 21a which may be secured together by cementing or by suitable rivets 22. The purpose of this two-layer construction is to provide for the reception of the metal strips 19a whose outer edges are formed into the circular beads 20a for securing the glass sheets in position. The material of the strips 17 and 18 is preferably fiber board having a tensile strength of about 5,000 lbs. per square inch, although laminated wood or other suitable organic material which is relatively strong and tough might be employed. Such materials are preferred, as compared with metal because of their cost, and because the danger of glass breakage is less in a support of this kind than in a metal support, a metal framing being subject to a relatively high degree of expansion and contraction under changing heat conditions, so that precautions have to be taken as to clearance which are not required with a frame of fiber board and the like.

Each of the cells formed by the inner frame is covered on its two sides by the glass sheets 23 and 24 which are preferably square and have their edges beveled so as to receive the cylindrical heads 20a of the holding strip 19. The holding strips 19a are required only on two edges of each plate, as indicated in Fig. 1, and after the assembly is made, the cylindrical heads 20 are collapsed by any suitable means, such as the tool 24a provided with a roller 25 as shown in Fig. 3, the right hand side of this figure showing the cylinder or bead in collapsed position. After the hollow beads are collapsed, the space outward therefrom is preferably filled with a plastic caulking material 26 which forms a seal and assists in securing the glass plates in position. A wide variety of glass plates may be used. They may be of rough rolled sheet glass having any desired configuration, or they may consist of plates which are pressed to the desired shape. Colored glass may also be used on one or both sides of the frame in order to secure ornamental effects.

If desired, the strips 17 and 18 may be made of one thickness 27, as indicated in Fig. 6, the edge strips being secured in position by means of rivets 28. At the edges of the glass plates which are not held by the securing members 19a, the spaces between the beveled edges of the plates are merely filled with caulking material 29, as indicated in Fig. 4.

In the modification shown in Fig. 7, the holding strips 19 having the heads 20a are employed on all four sides of the glass plates, the construction in other respects being the same as heretofore described. This gives some additional security in holding the glass plates, but is not ordinarily required.

Figs. 8 and 9 show another method of securing the glass plates 23 in position on the inner frame. In this case, the strips 30 constituting the frame are in one layer and the wedge-shaped recesses between the edges of the plates carry metal strips 31 which are perforated for the passage of the spaced screws 32 which extend into the fiber board strips 30.

In the construction shown in Fig. 10, the glass plates 23 are secured to the strips 33 constituting the cellular frame by means of the strips 34 held in position by means of the rivets 35. The outer ends of these strips 34 are bent over the faces of the glass sheets, as indicated at 36, and in this case, no beveling of the glass sheets is required.

Figs. 11 and 12 illustrate another modification, in which one set of strips constituting the inner frame, such as the vertical strips 37 are made continuous instead of being notched at their edges as is the case in the Fig. 1 construction. The strips running transversely of the strip 37 are made in sections, such as the section 38, and are provided at each end with a dowel 39 which fits into a dowel recess 40 in the strip 37. As in the construction of Fig. 1, the strips are made in two layers and the short transverse strips 38 carry the holding strips 19a, as heretofore described. Due to the cutting of the transverse strips 38 into sections, substantially no beam strength is afforded by these members, but on the other hand, the upright strips 37 are only slightly weakened by the openings 40 at their neutral axes, so that the beam strength is nearly four times that of the upright members 17 of the Fig. 1 construction. As a whole, therefore, this construction of Figs. 11 and 12 is nearly twice as strong as that of the construction of Fig. 1. On the other hand, it is more expensive to construct and install.

The construction of Fig. 13 is on the order of that of Figs. 11 and 12 except that the sheet sections 41 are secured to the through sections 42 by means of angle strips 43.

Fig. 14 illustrates the use of a metal inner frame, in which the two sets of strips 44 and 45 are of shell-like form and may be made of thin copper, aluminum or other rolled sheet metal. These strips may be soldered together at their intersections and are provided with beads 46 corresponding in function to the beads 20a of the construction heretofore described. The installation and securing of the glass is the same as heretofore set forth, the beads being pressed down after the glass plates are installed and the caulking material applied to cover the collapsed edges. The shells may be provided with a reinforcing filler of wood or the like.

What I claim is:

1. In combination in a glass wall, an outside frame of rectangular shape, an inside frame mounted therein comprising a set of spaced upright strips and a set of spaced transverse strips dividing the space in the outside frame into a plurality of cells of rectangular cross section, a glass closure plate on the inner end outer side of each cell with the opposing edges of the plates on each side of the inside frame spaced apart and engaging said strips and means separate from the strips carried thereby and fitting down into the spaces between the edges of the plates so that they do not project out past the faces thereof.

2. In combination in a glass wall, an outside frame of rectangular shape, an inside frame mounted therein comprising a set of spaced upright strips and a set of spaced transverse strips dividing the space in the outside frame into a plurality of cells of rectangular cross section, a glass closure plate on the inner and outer side of each cell with the opposing edges of the plates on each side of the inside frame spaced apart and engaging said strips, fastening members carried by the strips and fitting down into the spaces between the edges of the plates securing the sheets to the strips, and caulking material in said spaces overlying said means with the outer face thereof substantially flush with the faces of the plates.

3. In combination in a glass wall, an outside frame of rectangular shape, an inside frame mounted therein comprising a set of spaced upright strips and a set of spaced transverse strips dividing the space in the outside frame into a plurality of cells of rectangular cross section, a glass closure plate on the inner and outer side of each cell with the opposing edges of the plates on each side of the inside frame spaced apart and bevelled and engaging the strips, and fastening members carried by the strips and having headed portions lying in the spaces between the bevelled plate edges securing the plates to the strips and lying below the faces of the plates.

4. In combination in a glass wall, an outside frame of rectangular shape, an inside frame mounted therein comprising a set of spaced upright strips and a set of spaced transverse strips dividing the space in the outside frame into a plurality of cells of rectangular cross section, a glass closure plate on the inner and outer side of each cell with the opposing edges of the plates on each side of the inside frame spaced apart and bevelled and engaging the strips, fastening members carried by the strips and having headed portions lying in the spaces between the bevelled plate edges below the faces of the plates securing the plates to the strips, and caulking material in said spaces overlying said headed portions.

5. In combination in a glass wall, an outside frame of rectangular shape, an inside frame mounted therein comprising a set of spaced upright strips and a set of spaced transverse strips dividing the space in the outside frame into a plurality of cells of rectangular cross section, said strips being of strong tough non-metallic material, a glass closure plate on the inner and outer side of each cell with the opposing edges of the plates on each side of the inside frame spaced apart and engaging said strips, and fastening members carried by the strips in the spaces between the edges of the plates and below the outer faces thereof securing the plates to the strips.

6. In combination in a glass wall, an outside frame of rectangular shape, an inside frame mounted therein comprising a set of spaced upright strips and a set of spaced transverse strips dividing the space in the outside frame into a plurality of cells of rectangular cross section, a glass closure plate on the inner and outer side of each cell with the opposing edges of the plate on each side of the inside frame spaced apart and engaging said strips, and means carried by the strips removable therefrom in the spaces between the edges of the plates below the outer faces thereof securing the plates to the strips, said upright and transverse strips being notched and fitted into each other at their points of intersection.

7. In combination in a glass wall, an outside frame of rectangular shape, an inside frame mounted therein comprising a set of spaced upright strips and a set of spaced transverse strips dividing the space in the outside frame into a plurality of cells of rectangular cross section, a glass closure plate on the inner and outer side of each cell with the opposing edges of the plates on each side of the inside frame spaced apart and engaging said strips, and means separate from the strips carried by the strips in the spaces between the edges of the plates below the outer faces thereof securing the plates to the strips, one of each sets of strips being continuous throughout their length to give maximum beam strength and the other set being made in sections attached at their ends to the continuous strips.

8. In combination in a glass wall, an outside frame of rectangular shape, an inside frame mounted therein comprising a set of spaced upright strips and a set of spaced transverse strips dividing the space in the outside frame into a plurality of cells of rectangular cross section, a glass closure plate on the inner and outer side of each cell with the opposing edges of the plates on each side of the inside frame spaced apart and bevelled and engaging the strips and fastening members carried by the strips and having hollow heads of tubular cross section lying in the spaces between the bevelled plate edges and adapted to be collapsed so that they lie below the outer faces of the plates for securing the plates to the strips.

GEORGE L. WEST.